US010539859B2

(12) United States Patent
Watanabe

(10) Patent No.: US 10,539,859 B2
(45) Date of Patent: Jan. 21, 2020

(54) ACCESSORY APPARATUS FOR COMMUNICATING WITH AN IMAGE PICKUP APPARATUS, IMAGE PICKUP APPARATUS FOR COMMUNICATING WITH AN ACCESSORY APPPARATUS, AND IMAGING SYSTEM PROVIDING TECHNIQUES FOR COMMUNICATING BETWEEN AN ACCESSORY APPARATUS AND AN IMAGE PICKUP APPARATUS

(71) Applicant: CANON KABUSHIKI KAISHA, Tokyo (JP)

(72) Inventor: Yutaka Watanabe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/934,732

(22) Filed: Mar. 23, 2018

(65) Prior Publication Data
US 2018/0275494 A1 Sep. 27, 2018

(30) Foreign Application Priority Data

Mar. 27, 2017 (JP) ................. 2017-061563
Mar. 27, 2017 (JP) ................. 2017-061564

(51) Int. Cl.
*G03B 17/56* (2006.01)
*G03B 17/14* (2006.01)
(Continued)

(52) U.S. Cl.
CPC ........... *G03B 17/568* (2013.01); *G03B 17/14* (2013.01); *G06F 1/3203* (2013.01);
(Continued)

(58) Field of Classification Search
CPC ............. H04N 5/23209; H04N 5/2254; H04N 5/23241; G03B 17/12; G03B 17/14;
(Continued)

(56) References Cited

U.S. PATENT DOCUMENTS 8,757,904 B2 * 6/2014 Hasuda .................. G03B 17/14
396/530
10,044,924 B2 * 8/2018 Takanashi .......... H04N 5/23203
(Continued)

FOREIGN PATENT DOCUMENTS

EP 2664954 A2 11/2013
JP 5517486 B2 6/2014
JP 2014-235449 A 12/2014

*Primary Examiner* — Ngoc Yen T Vu
(74) *Attorney, Agent, or Firm* — Canon U.S.A., Inc. IP Division

(57) ABSTRACT

An interchangeable lens serving as an accessory apparatus includes a power control unit configured to switch between a first power state where communication with a camera main body serving as an image pickup apparatus is possible and a second power state which provides smaller power consumption than the first power state. The interchangeable lens also includes a setting unit configured to switch a communication setting between a first setting corresponding to a first communication method that is a communication method used in an initial communication and a second setting corresponding to a second communication method different from the first communication method. In addition, in a case where the communication setting of the interchangeable lens is the second setting, the power control unit does not perform the switching from the first power state to the second power state.

22 Claims, 10 Drawing Sheets

(51) Int. Cl.
  *G06F 1/3203* (2019.01)
  *H04N 5/232* (2006.01)
  *H04N 5/225* (2006.01)
(52) U.S. Cl.
  CPC ..... *H04N 5/23209* (2013.01); *H04N 5/23293* (2013.01); *H04N 5/2254* (2013.01); *H04N 5/23241* (2013.01)
(58) Field of Classification Search
  CPC .......... G03B 2206/00; G03B 2217/007; G03B 17/568; G06F 1/32; G06F 1/3203
  See application file for complete search history.

(56) References Cited

U.S. PATENT DOCUMENTS

| | | | |
|---|---|---|---|
| 2002/0118963 A1 | 8/2002 | Uenaka et al. | |
| 2011/0063462 A1 | 3/2011 | Koike | |
| 2011/0080488 A1 | 4/2011 | Okamoto et al. | |
| 2011/0170853 A1 | 7/2011 | Osawa | |
| 2017/0289431 A1* | 10/2017 | Wada | H04N 5/23209 |
| 2018/0352140 A1* | 12/2018 | Tsukamoto | G03B 7/20 |

* cited by examiner

COMMUNICATION CMD1

COMMUNICATION CMD2

COMMUNICATION CMD1

COMMUNICATION CMD2

ACCESSORY APPARATUS FOR COMMUNICATING WITH AN IMAGE PICKUP APPARATUS, IMAGE PICKUP APPARATUS FOR COMMUNICATING WITH AN ACCESSORY APPPARATUS, AND IMAGING SYSTEM PROVIDING TECHNIQUES FOR COMMUNICATING BETWEEN AN ACCESSORY APPARATUS AND AN IMAGE PICKUP APPARATUS

BACKGROUND

Field

The present disclosure relates to an accessory apparatus and an image pickup apparatus capable of communicating with each other.

Description of the Related Art

In a known lens-interchangeable camera system, a camera main body serving as an image pickup apparatus issues a control command to a lens apparatus serving as an accessory apparatus. In such a lens-interchangeable camera system, the camera main body and the lens apparatus are known to communicate with each other via a communication line so that the camera main body transmits a command to an interchangeable lens, and the interchangeable lens transmits lens information to the camera main body.

Japanese Patent No. 5517486 discusses a camera main body and an interchangeable lens which support both a clock-synchronous serial communication method and an asynchronous serial communication method, where the camera main body and the interchangeable lens are capable of communicating with each other while switching between the two communication methods.

Japanese Patent Application Laid-Open No. 2014-235449 discusses an accessory apparatus capable of switching between a first power state (active state) in which the accessory apparatus steadily communicates with a camera main body and a second power state (sleep state) in which the accessory apparatus does not communicate with the camera main body and provides smaller power consumption than the first power state. In Japanese Patent Application Laid-Open No. 2014-235449, a command (sleep command) for switching the power state of the accessory apparatus from the first power state to the second power state and a command (sleep cancellation command) for switching the power state from the second power state to the first power state are transmitted from an image pickup apparatus to the accessory apparatus.

Problems can arise where an accessory apparatus capable of switching its power state in response to a command from an image pickup apparatus may enter the second power state under the influence of noise on a communication line even though the image pickup apparatus has not transmitted the sleep command to the accessory apparatus. If such a noise influence occurs in an accessory apparatus capable of communicating with an image pickup apparatus via a plurality of communication methods, mismatching of the communication method used by the image pickup apparatus and the accessory apparatus can occur, causing the image pickup apparatus and the accessory apparatus to be unable to appropriately communicate with each other.

There can arise a problem where an interchangeable lens communicating with the camera main body while switching between two communication methods becomes unable to suitably communicate with the camera main body if the communication method of the interchangeable lens does not coincide with the communication method of the camera main body at the time of switching from the second power state to the first power state.

SUMMARY

The present disclosure is directed to enabling an accessory apparatus to suitably communicate with an image pickup apparatus, the accessory apparatus capable of communicating with the image pickup apparatus by using a plurality of communication methods and capable of switching power states.

According to one embodiment of the present disclosure, there is provided an accessory apparatus capable of communicating with an image pickup apparatus by using a plurality of communication methods. The accessory apparatus includes an attachment unit for detachably attaching the accessory apparatus to the image pickup apparatus, a communication unit configured to, when the accessory apparatus is attached to the image pickup apparatus, perform initial communication for transmitting, to the image pickup apparatus, information about a communication method supported by the accessory apparatus, an accessory side setting unit configured to switch a communication setting between a first setting corresponding to a first communication method that is the communication method used in the initial communication and a second setting corresponding to a second communication method different from the first communication method, and a power control unit configured to, upon reception of a signal transmitted from the image pickup apparatus, switch between a first power state where communication with the image pickup apparatus is possible and a second power state which provides smaller power consumption than the first power state. In a case where the communication setting of the accessory apparatus is the first setting, the power control unit performs switching from the first power state to the second power state upon reception of the signal transmitted from the image pickup apparatus. In a case where the communication setting of the accessory apparatus is the second setting, the power control unit does not perform switching from the first power state to the second power state.

According to another embodiment of the present disclosure, there is provided an accessory apparatus capable of communicating with an image pickup apparatus by using a plurality of communication methods. The accessory apparatus includes an attachment unit for detachably attaching the accessory apparatus to the image pickup apparatus, a power control unit configured to, upon reception of a signal transmitted from the image pickup apparatus, switch between a first power state where communication with the image pickup apparatus is possible and a second power state which provides smaller power consumption than the first power state, and an accessory side setting unit configured to set a communication method to be used for communication with the image pickup apparatus that is performed at the time of switching from the second power state to the first power state.

According to yet another embodiment of the present disclosure, there is provided an image pickup apparatus capable of communicating with the accessory apparatus by using a plurality of communication methods. The image pickup apparatus includes an attachment unit for detachably attaching the accessory apparatus, and a camera control unit configured to control communication with the accessory apparatus. When the accessory apparatus is attached to the image pickup apparatus, the camera control unit performs initial communication for acquiring information about a communication method supported by the accessory apparatus, by using a first communication method. In a state where a communication setting of the accessory apparatus is a setting corresponding to a second communication method different from the first communication method, the camera control unit transmits to the accessory apparatus a signal for switching the communication setting of the accessory apparatus to a setting corresponding to the first communication method, and then transmits to the accessory apparatus a signal for switching a power state thereof from a first power state to a second power state which provides smaller power consumption than the first power state.

According to yet another embodiment of the present disclosure, there is provided an image pickup apparatus capable of communicating with an accessory apparatus by using a plurality of communication methods. The image pickup apparatus includes an attachment unit for detachably attaching the accessory apparatus, and a camera side setting unit configured to set a communication method to be used when transmitting to the accessory apparatus a signal for switching a power state of the accessory apparatus to a first power state from a second power state which provides smaller power consumption than the first power state.

Further features will become apparent from the following description of exemplary embodiments with reference to the attached drawings.

DESCRIPTION OF THE EMBODIMENTS

Exemplary embodiments of an accessory apparatus and an image pickup apparatus of the present disclosure will be described below with reference to the accompanying drawings.

Prior to detailed descriptions of power state switching and communication method setting according to each exemplary embodiment, features of the accessory apparatus and the image pickup apparatus of the present disclosure common to exemplary embodiments will be described below.

An interchangeable lens serving as an accessory apparatus according to each exemplary embodiment is capable of switching between a first power state and a second power state (described below) upon reception of a signal from a camera main body serving as an image pickup apparatus. The camera main body and the interchangeable lens according to each exemplary embodiment can transmit control commands and internal information via respective communication units included in the camera main body and the interchangeable lens. The respective communication units can communicate with each other by using the first and the second communication methods (described below), and select the communication method most suitable for various situations by selecting the same communication method (synchronization method) depending on the type of communication data and the purpose of communication.

Figure 1:
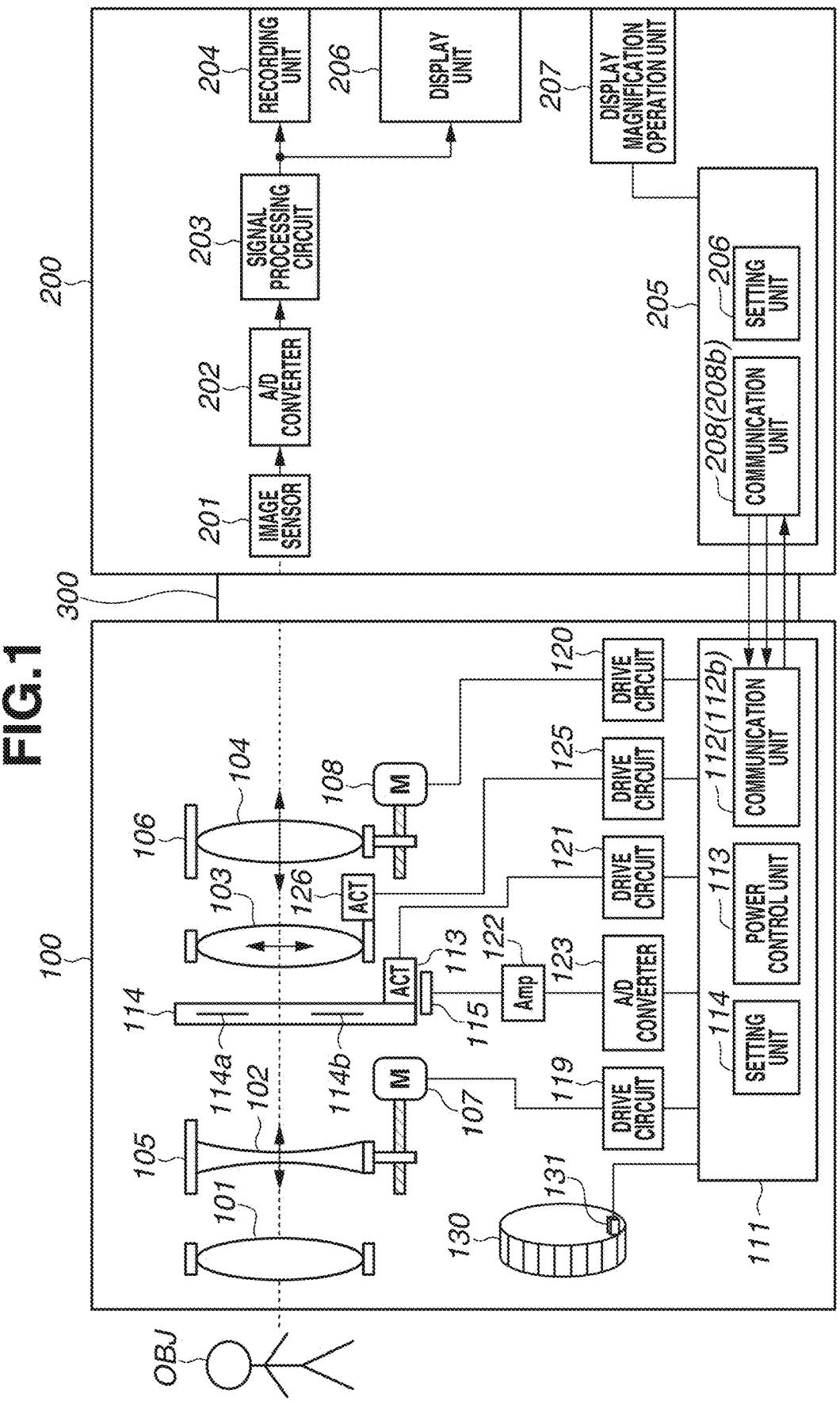
FIG. 1 is a block diagram illustrating configurations of an image pickup apparatus and an accessory apparatus.

First, specific configurations of an interchangeable lens 100 and a camera main body 200 representing an interchangeable lens and a camera main body, respectively, according to each exemplary embodiment will be described below. FIG. 1 illustrates a configuration of an imaging system (hereinafter a camera system) including the camera main body 200 and the interchangeable lens 100. Referring to FIG. 1, the interchangeable lens 100 is detachably attached to the camera main body 200.

The interchangeable lens 100 and the camera main body 200 are mechanically and electrically connected with each other via a mount 300 serving as a coupling mechanism. The interchangeable lens 100 receives power supplied from the camera main body 200 via a power terminal (not illustrated) provided in the mount 300 to control various actuators and a lens microcomputer 111 (described below). The interchangeable lens 100 and the camera main body 200 communicate with each other via a communication terminal provided in the mount 300.

The interchangeable lens 100 includes an imaging optical system. The imaging optical system includes a field lens 101, a lens 102 for varying the magnification, a diaphragm unit 114 for adjusting the light amount, an image shake correction lens 103, and a focal lens 104 for performing focus adjustment, from the side of a subject OBJ.

The magnification varying lens 102 and the focal lens 104 are supported by lens holding frames 105 and 106, respectively. The lens holding frames 105 and 106 are guided to be movable in the direction along the optical axis (drawn by dashed lines) by a guide axis (not illustrated), and are driven in the direction along the optical axis by stepping motors 107 and 108, respectively. The stepping motors 107 and 108 move the magnification varying lens 102 and the focal lens 104, respectively, in synchronization with a drive pulse.

The image shake correction lens 103 moves in a direction perpendicularly intersecting with the optical axis of the imaging optical system to reduce an image shake resulting from a camera shake.

The lens microcomputer 111 is an accessory control unit for controlling the operation of each component in the interchangeable lens 100. The lens microcomputer 111 includes a lens communication unit 112 including a lens data transmission/reception unit 112b for transmitting and receiving data via a communication interface (I/F) circuit 112a (illustrated in FIG. 2). The lens microcomputer 111 performs lens control corresponding to a control command received from the camera main body 200, and transmits lens data corresponding to a transmission request to the camera main body 200 via the lens communication unit 112. The lens data includes optical information of the interchangeable lens 100 and characteristic information (lens identifier (ID)) specific to the interchangeable lens 100.

In response to a magnification varying command or focusing command of control commands, the lens microcomputer 111 outputs drive signals to a zoom drive circuit 119 and a focus drive circuit 120 to drive the stepping motors 107 and 108, respectively. In this way, the lens microcomputer 111 performs zoom processing for controlling the magnification varying operation via the magnification varying lens 102, and automatic focus processing for controlling the focus adjustment operation via the focal lens 104.

The diaphragm unit 114 includes diaphragm blades 114a and 114b. The states of the diaphragm blades 114a and 114b are detected by a Hall element 115 and then input to the lens microcomputer 111 via an amplification circuit 122 and an analog-to-digital (A/D) conversion circuit 123. Based on an input signal from the A/D conversion circuit 123, the lens microcomputer 111 outputs a drive signal to a diaphragm drive circuit 121 to drive an actuator 113, thus controlling the light amount adjustment operation by the diaphragm unit 114.

The lens microcomputer 111 further drives an image stabilization actuator 126 via an image stabilization drive circuit 125 in response to a shake detected by a shake sensor (not illustrated) such as a vibrating gyroscope included in the interchangeable lens 100. In this way, the lens microcomputer 111 performs image stabilization processing for controlling the shift operation of the image shake correction lens 103.

The lens microcomputer 111 also includes a power control unit 113 for controlling the power state of the interchangeable lens 100. The power control unit 113 switches the power state between the first power state and the second power state which provides smaller power consumption than the first power state. When the interchangeable lens 100 is in the first power state, the lens microcomputer 111 is in the active state and steadily communicates with the camera main body 200. When the interchangeable lens 100 is in the second power state, the lens microcomputer 111 is in the sleep state. In this case, the lens microcomputer 111 waits until a command for switching to the first power state is transmitted from the camera main body 200.

The power control unit 113 performs power control when the lens microcomputer 111 receives a predetermined control command from the camera main body 200. The power control unit 113 may spontaneously switch the power state from the first power state to the second power state even if the lens microcomputer 111 has not received the predetermined control command from the camera main body 200.

The lens microcomputer 111 also includes a lens side setting unit 114 serving as an accessory side setting unit for switching the communication setting of the lens communication unit 112 according to the communication method to be used for communication with the camera main body 200.

The camera main body 200 includes an image sensor 201 such as a charge coupled device (CCD) sensor or a complementary metal-oxide semiconductor (CMOS) sensor, an A/D conversion circuit 202, a signal processing circuit 203, a recording unit 204, a camera microcomputer 205, and a display unit 206.

The image sensor 201 performs photoelectric conversion on a subject image formed by the imaging optical system in the interchangeable lens 100 and outputs an electric signal (analog signal). The A/D conversion circuit 202 converts the analog signal from the image sensor 201 into a digital signal. The signal processing circuit 203 performs various image processing on the digital signal from the A/D conversion circuit 202 to generate a video signal.

The signal processing circuit 203 also generates focus information indicating the contrast state of the subject image from the video signal, i.e., the focusing state of the imaging optical system, and luminance information indicating the exposure state. The signal processing circuit 203 outputs the video signal to the display unit 206. The display unit 206 displays the video signal as a live view image to be used to confirm the field angle and the focusing state.

The camera microcomputer 205 serving as a camera control unit controls the camera main body 200 in response to inputs from camera operation members such as an imaging instruction switch and various setting switches (not illustrated). The camera microcomputer 205 includes a camera communication unit 208 including a camera data transmission/reception unit 208b for transmitting and receiving data via a communication interface (I/F) circuit 208a (illustrated in FIG. 2) and transmits various control commands to the lens microcomputer 111.

The camera microcomputer 205 also includes a camera side setting unit 206 for switching the communication setting of the camera communication unit 208 according to the communication method to be used for communication with the lens microcomputer 111.

Figure 2:
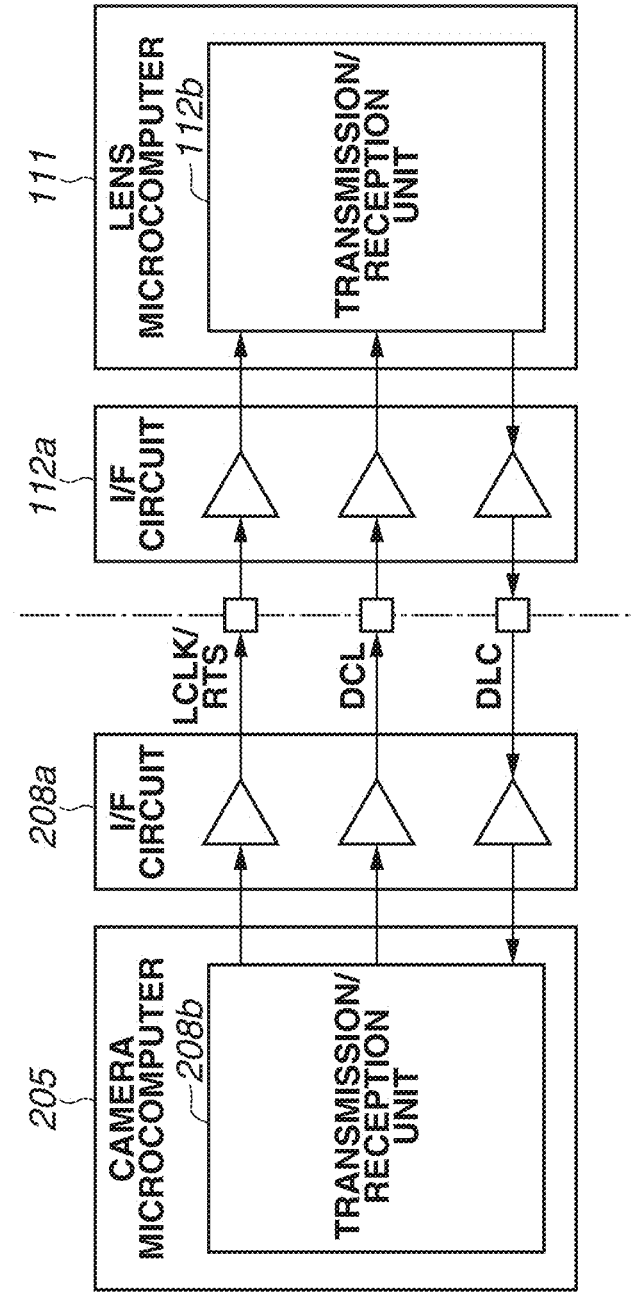
FIG. 2 schematically illustrates a communication circuit between the image pickup apparatus and the accessory apparatus.

A communication circuit configured between the camera main body 200 and the interchangeable lens 100 and communication control therebetween will be described below with reference to FIG. 2. The camera microcomputer 205 is provided with a function of managing the communication method to be used for communication with the lens microcomputers 111, and a function of issuing a notification such as a transmission request to the lens microcomputer 111. The lens microcomputer 111 is also provided with a function of generating lens data and a function of transmitting lens data.

The camera microcomputer 205 and the lens microcomputer 111 communicate with each other via a communication terminal provided in the mount 300 and the communication interface circuits 208a and 112a respectively provided in the camera microcomputer 205 and the lens microcomputer 111.

The camera microcomputer 205 and the lens microcomputer 111 communicate with each other based on a three-wire clock-synchronous serial communication method and a three-wire asynchronous serial communication method by using three channels (communication lines). Hereinafter, the three-wire clock-synchronous serial communication method is referred to as a communication method A (first communication method), and the three-wire asynchronous serial communication method is referred to as a communication method B (second communication method).

One of the above-described three channels serves as a clock channel in the communication method A and serves as a notification channel, i.e., a transmission request channel in the communication method B. One of the two remaining channels serves as a first data communication channel used for lens data transmission from the lens microcomputer 111 to the camera microcomputer 205. The other channel serves as a second data communication channel used for camera data transmission from the camera microcomputer 205 to the lens microcomputer 111.

Lens data transmitted as a signal from the lens microcomputer 111 to the camera microcomputer 205 via the first data communication channel is referred to as a lens data signal DLC. Camera data transmitted as a signal from the camera microcomputer 205 to the lens microcomputer 111 via the second data communication channel is referred to as a camera data signal DCL.

First, communication using the communication method A will be described below. In the communication method A, the camera microcomputer 205 that is a communication master outputs a clock signal LCLK to the lens microcomputer 111 that is a communication slave via the clock channel. The camera data signal DCL includes a control command and a transmission request command to be transmitted from the camera microcomputer 205 to the lens microcomputer 111. On the other hand, the lens data signal DLC includes various kinds of data to be transmitted from the lens microcomputer 111 to the camera microcomputer 205 in synchronization with the clock signal LCLK. The camera microcomputer 205 and the lens microcomputer 111 can perform communication based on the full-duplex method, i.e., a method of simultaneously transmitting and receiving data to/from each other in synchronization with the common clock signal LCLK.

Figure 3A:
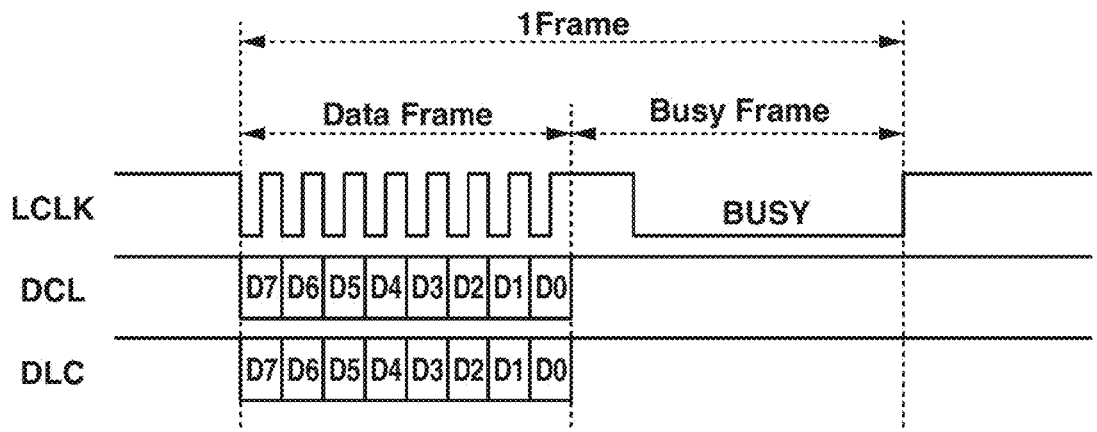
FIGS. 3A, 3B, and 3C schematically illustrate communication waveforms at the time of communication using a clock-synchronous serial communication method.
Figure 3B:
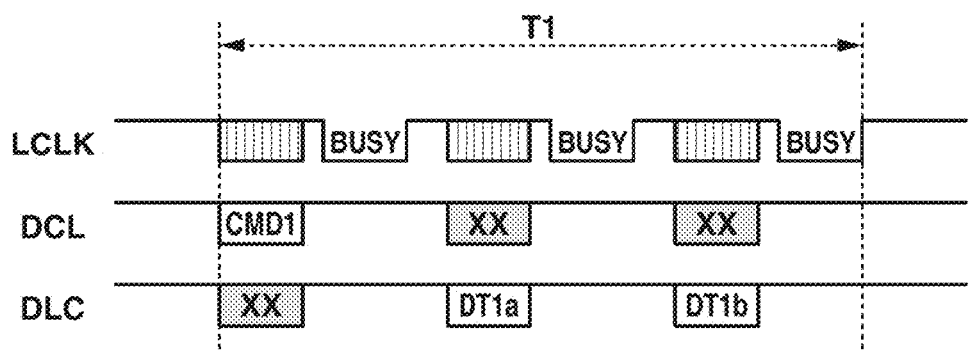
Figure 3C:
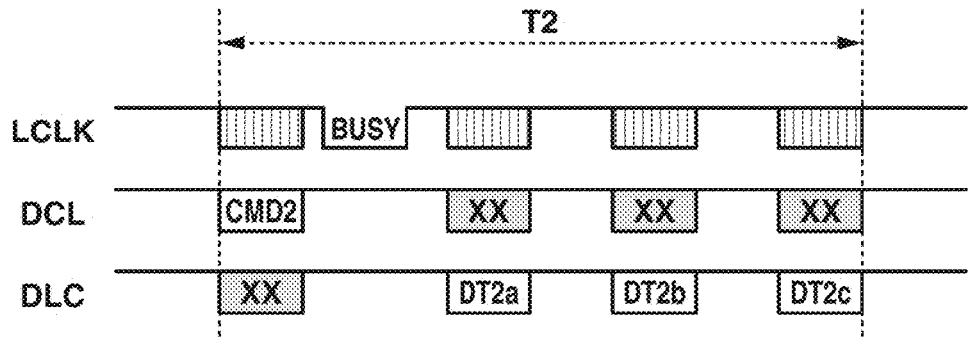

FIGS. 3A to 3C illustrate waveforms of signals exchanged between the camera microcomputer 205 and the lens microcomputer 111 in the communication method A. A predetermined procedure for the signal exchange is referred to as a communication protocol.

FIG. 3A illustrates signal waveforms in one frame that is the minimum communication unit. First, the camera microcomputer 205 outputs the clock signal LCLK in which 8-period clock pulses are handled as one set, and simultaneously transmits the camera data signal DCL to the lens microcomputer 111 in synchronization with the clock signal LCLK. At the same time, the camera microcomputer 205 receives the lens data signal DLC output from the lens microcomputer 111 in synchronization with the clock signal LCLK.

In this way, 1-byte (8-bit) data is transmitted and received between the lens microcomputer 111 and the camera microcomputer 205 in synchronization with one set of clock signals LCLK. The time period of transmission and reception of 1-byte data is referred to as a data frame. After transmission and reception of 1-byte data, the lens microcomputer 111 transmits a notification signal of a communication wait request BUSY (hereinafter referred to as a BUSY signal) to the camera microcomputer 205. Thus, a communication waiting period is inserted. The communication waiting period is referred to as a BUSY frame. The camera microcomputer 205 is in a communication wait state during reception of the BUSY frame. A communication unit including a set of a data frame and a BUSY frame forms one frame. The BUSY frame may not be added depending on the communication status. In this case, one frame includes only a data frame.

FIG. 3B illustrates signal waveforms when the camera microcomputer 205 transmits to the lens microcomputer 111 a command CMD1 for requesting data transmission and receives from the lens microcomputer 111 two-byte lens data DT1 (DT1a and DT1b) in response to the command CMD1. FIG. 3B illustrates an example in which data communication is performed in response to the "command CMD1".

The type and the number of bytes of lens data DT corresponding to each of a plurality of types of commands are predetermined between the camera microcomputer 205 and the lens microcomputer 111. When the camera microcomputer 205 serving as a communication master transmits a specific command to the lens microcomputer 111, the lens microcomputer 111 transmits the required number of clocks to the camera microcomputer 205 based on information about the number of bytes of lens data corresponding to the command. Processing for the command CMD1 to be performed by the lens microcomputer 111 includes superimposing the BUSY signal on the clock signal LCLK for each frame. The above-described BUSY frame is inserted between data frames.

By using the command CMD1, the camera microcomputer 205 transmits the clock signal LCLK to the lens microcomputer 111. The camera microcomputer 205 also transmits to the lens microcomputer 111 the command CMD1 for requesting the transmission of the lens data DT1 as the camera data signal DCL. The lens data signal DLC in this frame is handled as invalid data.

Subsequently, after outputting 8 cycles of the clock signal LCLK via the clock channel, the camera microcomputer 205 switches the clock channel on the side of the camera microcomputer 205 (the side of the camera main body 200) from the output setting to the input setting. Upon completion of the clock channel switching on the side of the camera microcomputer 205, the lens microcomputer 111 switches the clock channel on the side of the lens microcomputer 111 (the side of the interchangeable lens 100) from the input setting to the output setting. Then, to issue a communication wait request BUSY notification to the camera microcomputer 205, the lens microcomputer 111 sets the voltage level of the clock channel to Low. The setting superimposes the BUSY signal on the clock channel. In the time period during which a communication wait request BUSY notification is issued, the camera microcomputer 205 maintains the input setting of the clock channel and stops communication with the lens microcomputer 111.

In the time period during which a communication wait request BUSY notification is issued, the lens microcomputer 111 generates lens data DT1 corresponding to the command CMD1. Then, upon completion of the preparation for transmitting the lens data DT1 as the lens data signal DLC for the following frame, the lens microcomputer 111 switches the signal level of the clock channel on the side of the lens microcomputer 111 to High to cancel the communication wait request BUSY.

Upon recognition of the cancellation of the communication wait request BUSY, the camera microcomputer 205 transmits the clock signal LCLK for one frame to the lens microcomputer 111 and then receives the lens data DT1a from the lens microcomputer 111. When the camera microcomputer 205 and the lens microcomputer 111 repeat operations similar to the above-described operations, the camera microcomputer 205 receives the lens data DT1b from the lens microcomputer 111.

FIG. 3C illustrates signal waveforms when the camera microcomputer 205 transmits to the lens microcomputer 111 a command CMD2 for requesting data transmission and then receives from the lens microcomputer 111 three-byte lens data DT2 (DT2a to DT2c) corresponding to the command CMD2. FIG. 3C illustrates an example in which data communication is performed in response to the command CMD2. Processing for the command CMD2 to be performed by the lens microcomputer 111 includes superimposing the BUSY signal on the clock channel only for the first frame. More specifically, the lens microcomputer 111 does not superimpose the BUSY signal on the subsequent second to fourth frames.

In this way, the BUSY frame is not inserted into the second to the fourth frames. This makes it possible to shorten the waiting period between frames. However, in the time period during which the BUSY frame is not inserted, the lens microcomputer 111 cannot transmit a communication wait request to the camera microcomputer 205. Therefore, to prevent a communication breakdown, it is necessary to determine the number of pieces of data to be transmitted, the transmission interval, and the priority of communication processing in the lens microcomputer 111.

Figure 4A:
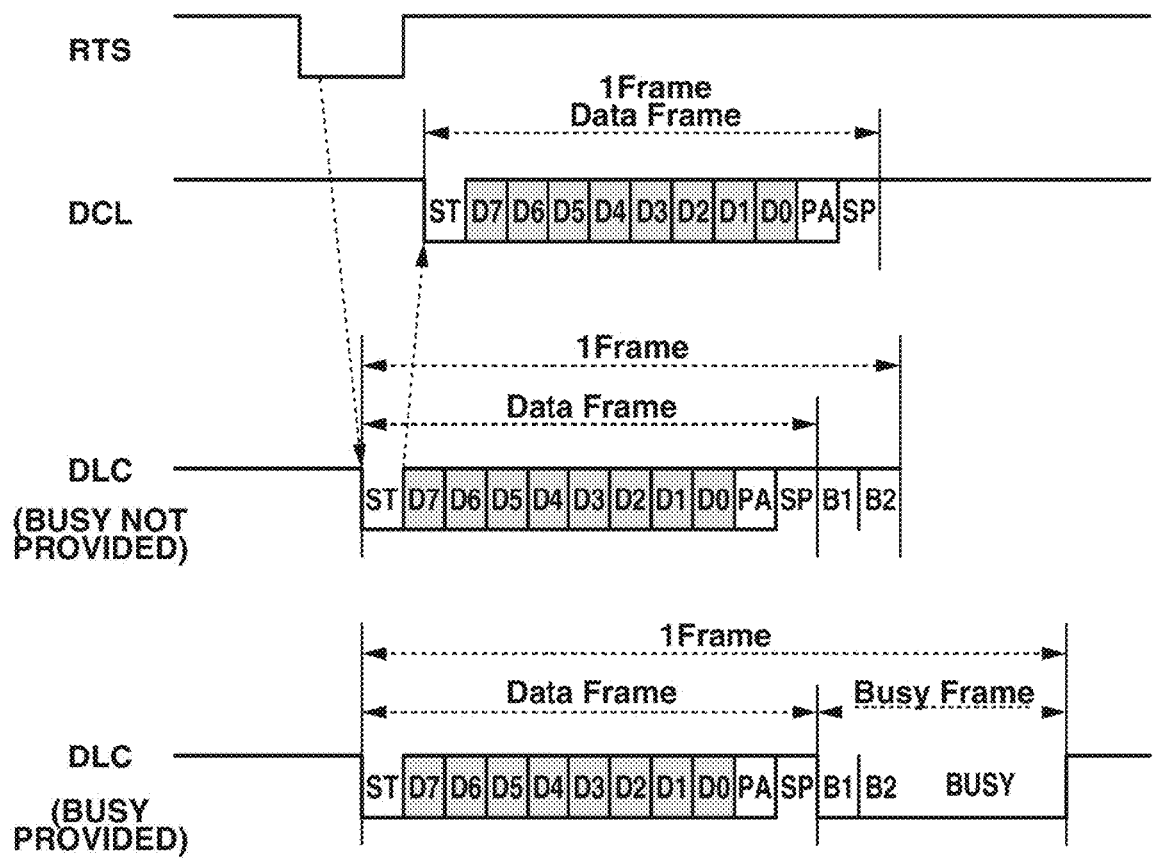
FIGS. 4A, 4B, and 4C schematically illustrate communication waveforms at the time of communication with an asynchronous serial communication method.
Figure 4B:
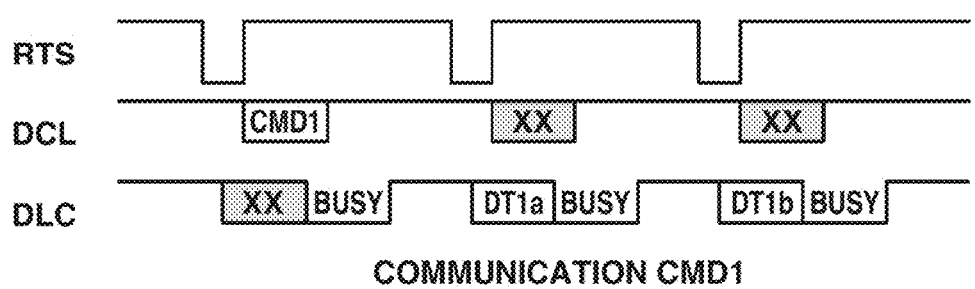
Figure 4C:
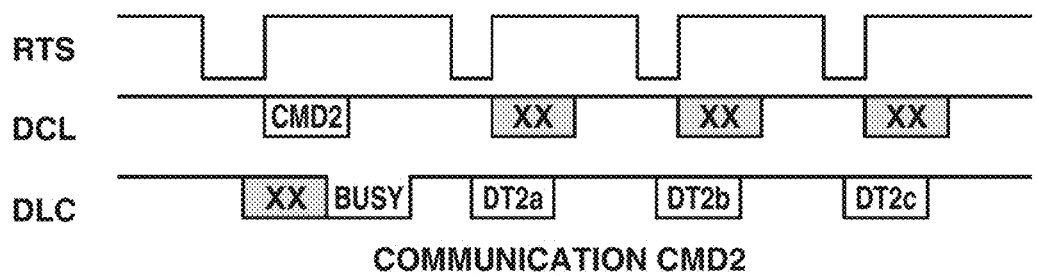

Communication using the communication method B will be described below. FIGS. 4A to 4C illustrate waveforms of communication signals exchanged between the camera microcomputer 205 and the lens microcomputer 111 in the communication method B.

In the communication method B, the transmission request channel is used by the camera microcomputer 205 serving as a communication master to issue a lens data transmission request notification to the lens microcomputer 111 serving as a communication slave. A notification is issued via the transmission request channel by switching the signal level (voltage level) between High (first level) and Low (second level) in the transmission request channel. In the following descriptions, a signal supplied to the transmission request channel in the communication method B is referred to as a transmission request signal RTS.

Similar to the communication method A, the first data communication channel is used by the lens microcomputer 111 to transmit the lens data signal DLC including various types of data to the camera microcomputer 205. Similar to the communication method A, the second data communication channel is also used by the camera microcomputer 205 to transmit the camera data signal DCL including a control command and a transmission request command to the lens microcomputer 111.

In the communication method B, unlike the communication method A, the camera microcomputer 205 and the lens microcomputer 111 do not transmit and receive data in synchronization with the common clock signal. Instead, the camera microcomputer 205 and the lens microcomputer 111 preset the communication rate, and transmit and receive data at a communication bit rate based on the setting. The communication bit rate indicates the amount of data which can be transmitted in one second. The unit of the communication bit rate is bit per second (bps).

According to each exemplary embodiment, also in the communication method B, the camera microcomputer 205 and the lens microcomputer 111 communicate with each other through the full-duplex method, i.e., a method of transmitting and receiving data to/from each other, similar to the communication method A.

FIG. 4A illustrates signal waveforms for one frame that is the minimum communication unit. The data format for one frame is partly different between the camera data signal DCL and lens data signal DLC.

First, the data format of the lens data signal DLC will be described below. The lens data signal DLC for one frame includes a data frame (first half) and a BUSY frame following the data frame. When data transmission is not performed, the signal level of the lens data signal DLC is held to High.

To issue a notification for starting the transmission of one frame of the lens data signal DLC to the camera microcomputer 205, the lens microcomputer 111 sets the voltage level of the lens data signal DLC to Low in a 1-bit period. The 1-bit period is referred to as a start bit ST, and a data frame is started from the start bit ST. Then, the lens microcomputer 111 transmits 1-byte lens data in the 8-bit period from the second to ninth bits, following the start bit ST.

Data bits are arranged in the most significant bit (MSB) first format which starts with data D7 of the MSB, followed by data D6, D5, . . . , D1, and ends with data D0 of the least significant bit. Then, the lens microcomputer 111 adds 1-bit parity (PA) information to the 10th bit and sets the voltage level of the lens data signal DLC to High during the time period of the stop bit SP indicating the end of one frame. This completes the data frame starting from the start bit ST. The parity information does not need to be one bit but may include a plurality of bits. The parity information is not always necessary, i.e., a format without the parity information is also applicable.

Then, as indicated by "DLC (BUSY Provided)" illustrated in FIG. 4A, the lens microcomputer 111 adds the BUSY frame after the stop bit SP. Similar to the communication method A, the BUSY frame represents the time period during which the lens microcomputer 111 issues a communication wait request BUSY notification to the camera microcomputer 205. The lens microcomputer 111 holds the signal level of the lens data signal DLC to Low until the communication wait request BUSY is canceled.

On the other hand, the lens microcomputer 111 may not need to issue a communication wait request BUSY notification to the camera microcomputer 205. In this case, as indicated by "DLC (BUSY Not Provided)" illustrated in FIG. 4A, there is also provided a data format for configuring one frame without adding the BUSY frame (hereinafter also referred to as a BUSY notification). More specifically, selectable data formats of the lens data signal DLC include data formats where a BUSY notification is added or not, depending on the processing condition on the side of the lens microcomputer 111.

A method used by the camera microcomputer 205 to identify the presence or absence of a BUSY notification will be described below. The signal waveforms indicated by "DLC (BUSY Not Provided)" and "DLC (BUSY Provided)" illustrated in FIG. 4A include bit positions B1 and B2. The camera microcomputer 205 selects either one of the bit positions B1 and B2 as a BUSY identification position P for identifying the presence or absence of a BUSY notification. Thus, each exemplary embodiment employs a data format where the BUSY identification position P is selected from the bit positions B1 and B2. This makes it possible to cope with a problem that the processing time period since the time when the data frame of the lens data signal DLC is transmitted till the time when a BUSY notification (DLC Low) is determined differs according to the processing performance of the lens microcomputer 111.

Before starting communication using the communication method B, the camera microcomputer 205 and the lens microcomputer 111 determine, through communication, whether the BUSY identification position P is set to the bit position B1 or B2. The BUSY identification position P does not need to be fixed to the bit position B1 or B2, and may be changed according to the processing ability of the camera microcomputer 205 and the lens microcomputer 111. The BUSY identification position P is not limited to the bit position B1 or B2 but can be set to a predetermined position following the stop bit SP.

The following describes the reason why the BUSY frame added to the clock signal LCLK in the communication method A is changed to the BUSY frame added to the lens data signal DLC in the communication method B.

In the communication method A, it is necessary to exchange, via the same clock channel, the clock signal LCLK output by the camera microcomputer 205 serving as a communication master and the BUSY signal output by the lens microcomputer 111 serving as a communication slave. Therefore, a collision between the outputs of the camera microcomputer 205 and the lens microcomputer 111 is prevented by a time-division method. More specifically, a collision between the outputs can be prevented by suitably assigning the output permission periods of the camera microcomputer 205 and the lens microcomputer 111 in the clock channel.

However, in the time-division method, it is necessary to certainly prevent a collision between the outputs of the camera microcomputer 205 and the lens microcomputer 111. Therefore, a fixed output inhibition period during which the outputs from the microcomputers 205 and 111 are inhibited is inserted into the time period since the time when the camera microcomputer 205 completes output of the 8-pulse clock signal LCLK till the time when the lens microcomputer 111 is permitted to output a BUSY signal. The output inhibition period serves as a communication invalidation period during which the camera microcomputer 205 and the lens microcomputer 111 cannot communicate with each other. Therefore, the effective communication rate may be degraded.

To solve this problem, the communication method B employs a data format in which the BUSY frame from the lens microcomputer 111 is added to the lens data signal DLC in the first data communication channel that is an output channel dedicated for the lens microcomputer 111.

The specifications of the data frame of the camera data signal DCL are common to the lens data signal DLC. However, unlike the lens data signal DLC, the addition of the BUSY frame to the camera data signal DCL is inhibited.

The following describes a procedure of communication using the communication method B between the camera microcomputer 205 and the lens microcomputer 111. First, when an event for starting communication with the lens microcomputer 111 occurs, the camera microcomputer 205 sets the voltage level of the transmission request signal RTS to Low (hereinafter also referred to as asserting the transmission request signal RTS) to issue a communication request notification to the lens microcomputer 111. An event means, for example, a user's operation on a release switch (not illustrated).

When the lens microcomputer 111 detects a communication request based on the change of the voltage level of the transmission request signal RTS to Low, the lens microcomputer 111 performs processing for generating the lens data signal DLC to be transmitted to the camera microcomputer 205. When the preparation for transmitting the lens data signal DLC is completed, the lens microcomputer 111 starts transmitting the lens data signal DLC for one frame via the first data communication channel. At a timing when the voltage level of the transmission request signal RTS becomes Low, the lens microcomputer 111 starts transmitting the lens data signal DLC within a time period mutually set between the camera microcomputer 205 and the lens microcomputer 111.

More specifically, in the communication method B, it is necessary to determine the lens data to be transmitted during the time period since the time when the voltage level of the transmission request signal RTS becomes Low till the time when the transmission of the lens data signal DLC is started. Unlike the communication method A, the communication method B does not have such a strict restriction as the necessity of determining the lens data to be transmitted by the time when the first clock pulse is input. This means that the communication method B makes it possible to provide flexibility in the timing for starting the transmission of the lens data signal DLC.

Upon detection of the start bit ST added to the head of the data frame of the lens data signal DLC received from the lens microcomputer 111, the camera microcomputer 205 returns the voltage level of the transmission request signal RTS to High (hereinafter referred to as negating the transmission request signal RTS). This setting cancels the transmission request. At the same time, the camera microcomputer 205 starts transmitting the camera data signal DCL via the second communication channel. The camera microcomputer 205 can negate the transmission request signal RTS and start transmitting the camera data signal DCL in an arbitrary order. These operations need to be performed before the reception of the data frame of the lens data signal DLC is completed.

After transmitting the data frame of the lens data signal DLC, the lens microcomputer 111 adds the BUSY frame to the lens data signal DLC when it is necessary to issue a communication wait request BUSY notification to the camera microcomputer 205. The camera microcomputer 205 is monitoring the presence or absence of a communication wait request BUSY notification. While a communication wait request BUSY notification is being issued, the camera microcomputer 205 is inhibited from asserting the transmission request signal RTS to request the following transmission.

The lens microcomputer 111 performs required processing in the time period during which communication from the camera microcomputer 205 is suspended via the communication wait request BUSY. Then, when the preparation for the following communication is completed, the lens microcomputer 111 cancels the communication wait request BUSY. When the communication wait request BUSY is canceled and the transmission of the data frame of the camera data signal DCL is completed, the camera microcomputer 205 is permitted to assert the transmission request signal RTS to request the following transmission.

In this way, in each exemplary embodiment, upon assertion of the transmission request signal RTS triggered by a communication start event in the camera microcomputer 205, the lens microcomputer 111 starts transmitting the data frame of the lens data signal DLC to the camera microcomputer 205. Then, upon detection of the start bit ST of the lens data signal DLC, the camera microcomputer 205 starts transmitting the data frame of the camera data signal DCL to the lens microcomputer 111.

The lens microcomputer 111 adds the BUSY frame after the data frame of the lens data signal DLC for the communication wait request BUSY as required. Then, the lens microcomputer 111 cancels the communication wait request BUSY to complete the communication processing for one frame. This communication processing performs the transmission and reception of 1-byte communication data between the camera microcomputer 205 and the lens microcomputer 111.

FIG. 4B illustrates signal waveforms when continuously performing communication in the data format indicated by "DLC (BUSY Provided)" illustrated in FIG. 4A. A communication wait request BUSY (BUSY frame) notification is issued from the lens microcomputer 111 to the camera microcomputer 205 by using the lens data signal DLC via the first data communication channel. Then, when the communication wait request BUSY is canceled, the following communication is started. CMD1 illustrated in FIG. 4B indicates a transmission request command transmitted as the camera data signal DCL from the camera microcomputer 205 to the lens microcomputer 111. Upon reception of the transmission request command CMD1, the lens microcomputer 111 transmits 2-byte lens data signal DT1 (DT1a and DT1b) corresponding to the command CMD1 to the camera microcomputer 205.

In the example illustrated in FIG. 4C, communication is performed based on the data format "BUSY Provided" and then communication is performed based on the data format "BUSY Not Provided". CMD2 indicates a control command and a transmission request command which are transmitted from the camera microcomputer 205 to the lens microcomputer 111 as the camera data signal DCL. Although FIG. 4C illustrates a case where a control command and a transmission request command are transmitted in one frame, a control command and a transmission request command may be transmitted in different frames. Upon reception of a control command of the command CMD2, the lens microcomputer 111 switches the data format from "BUSY Provided" to "BUSY Not Provided". Then, upon reception of a transmission request command of the command CMD2, the lens microcomputer 111 transmits 3-byte lens data signal DT2 (DT2a to DT2c) corresponding to the transmission request command to the camera microcomputer 205.

Figure 5:
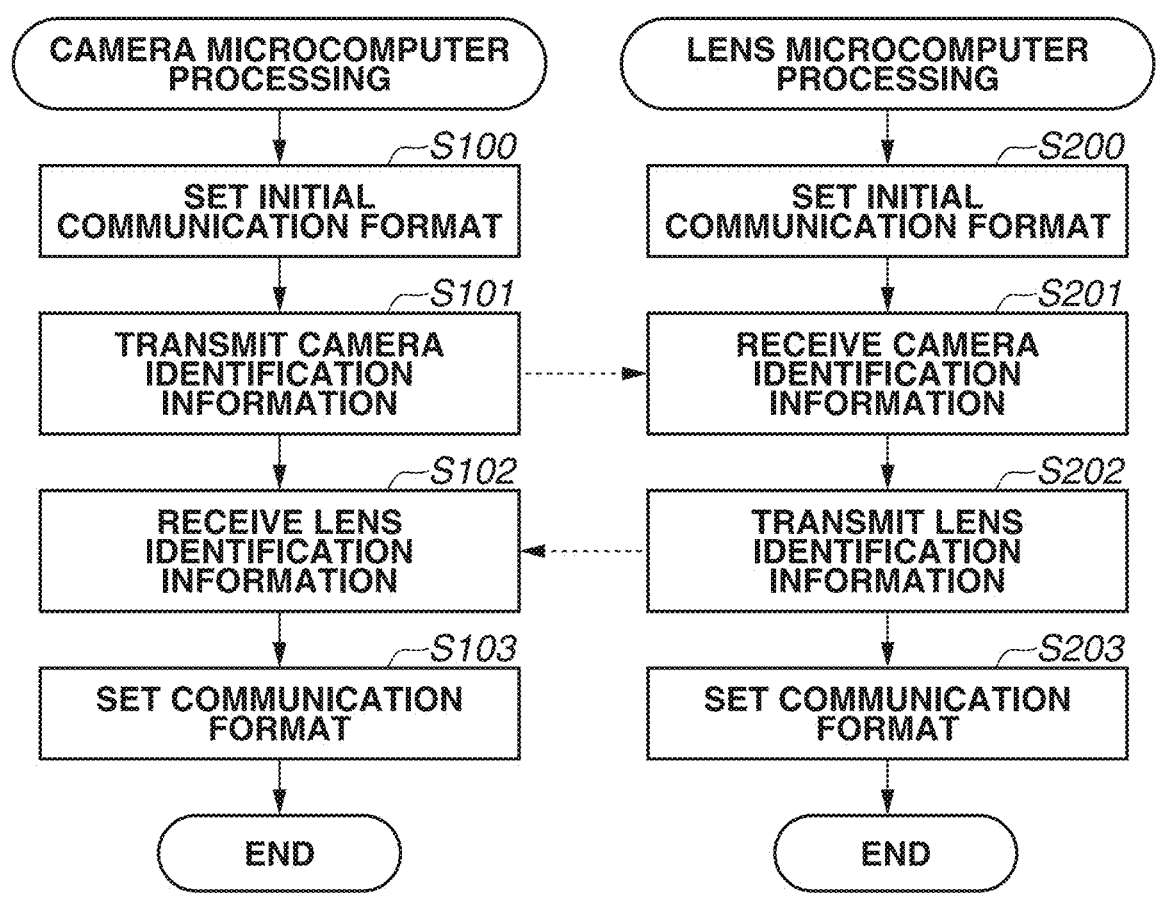
FIG. 5 is a flowchart illustrating processing for determining a communication method to be used for communication between the image pickup apparatus and the accessory apparatus.

A procedure for determining the communication method to be used for communication between the camera microcomputer 205 and the lens microcomputer 111 will be described below with reference to FIG. 5. The camera microcomputer 205 and the lens microcomputer 111 perform communication control illustrated in FIG. 5 according to a communication control program that is a computer program. Referring to FIG. 5, "S" means a step.

When the interchangeable lens 100 is attached to the camera main body 200, in steps S100 and S200, the camera microcomputer 205 and the lens microcomputer 111 sets the communication format to an initial communication format which assures the establishment of communication. The "communication format" refers to communication specifications determined by the combination of the communication method and the data format. In each exemplary embodiment, the communication method A is used as the communication method used for the initial communication format.

Then, the camera main body 200 and the interchangeable lens 100 perform initial communication for transmitting and receiving respective supported communication methods to/from each other. In step S101, the camera microcomputer 205 transmits camera identification information indicating the communication format supported by the camera main body 200 to the lens microcomputer 111, and the lens microcomputer 111 acquires the camera identification information. In step S202, the lens microcomputer 111 transmits lens identification information indicating the communication format supported by the interchangeable lens 100 to the camera microcomputer 205, and the camera microcomputer 205 receives the lens identification information.

The "identification information" includes information indicating whether the communication method B is supported in addition to the communication method A, and information indicating the range of applicable communication bit rates. The identification information also includes information indicating the BUSY identification position P.

In step S102, the camera microcomputer 205 receives the lens identification information. In step S201, the lens microcomputer 111 receives the camera identification information. Although, in the flowchart illustrated in FIG. 5, the lens identification information is transmitted after the camera identification information is transmitted, the camera identification information may be transmitted after the lens identification information is transmitted.

In steps S103 and S203, the camera microcomputer 205 and the lens microcomputer 111 set the respective communication formats to be used in subsequent communication. More specifically, when the interchangeable lens 100 attached to the camera main body 200 can perform communication by using the communication method B, the camera microcomputer 205 and the lens microcomputer 111 switch the communication method from the communication method A to the communication method B. The camera microcomputer 205 and the lens microcomputer 111 also determine as the communication bit rate the highest rate within the mutually applicable range. The camera microcomputer 205 and the lens microcomputer 111 also set as the BUSY identification position the position closest to the stop bit SP from among the mutually applicable BUSY identification positions.

Figure 6:
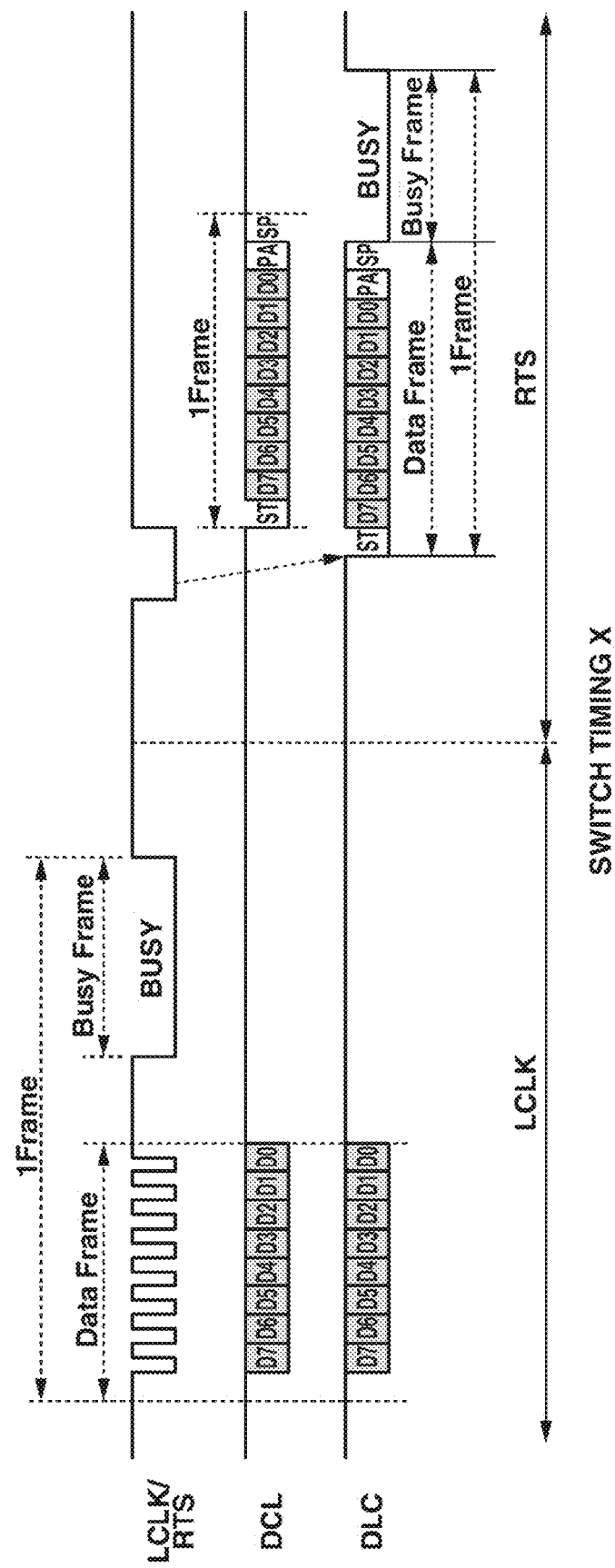
FIG. 6 schematically illustrates communication waveforms when switching the communication method.

A procedure for switching the communication method from the communication method A to the communication method B will be described below with reference to FIG. 6. FIG. 6 illustrates waveforms of communication signals exchanged between the camera microcomputer 205 and the lens microcomputer 111 before and after the switching from the communication method A to the communication method B. At the time of switching from the communication method A to the communication method B, the camera microcomputer 205 changes, via the camera side setting unit 206, the communication setting of the camera communication unit 208 from the first setting corresponding to the communication method A to the second setting corresponding to the communication method B. Likewise, the lens microcomputer 111 changes, via the lens side setting unit 114, the communication setting of the lens communication unit 112 from the first setting corresponding to the communication method A to the second setting corresponding to the communication method B.

At the switch timing X illustrated in FIG. 6, the camera microcomputer 205 and the lens microcomputer 111 complete the switching of the communication setting and subsequently perform communication based on the communication method B. As described above, the notification channel functions as a clock channel in the communication method A and functions as a transmission request channel in the communication method B.

In each exemplary embodiment, the lens microcomputer 111 serving as a communication slave in the communication method A changes the communication setting to the second setting corresponding to the communication method B before the camera microcomputer 205 serving as a communication master does.

The lens microcomputer 111 switches the communication method according to a command from the camera microcomputer 205. Through communication using the communication method A, the camera microcomputer 205 transmits a notification of switching from the communication method A to the communication method B to the lens microcomputer 111 via the second data communication channel. The notification of switching is included in the data frame. Upon reception of the notification of switching, the lens microcomputer 111 superimposes the BUSY signal on the clock channel to issue a communication wait request BUSY notification to the camera microcomputer 205. Then, while a communication wait request BUSY notification is being issued to the camera microcomputer 205, the lens microcomputer 111 changes, via the lens side setting unit 114, the communication setting of the lens communication unit 112 from the first setting corresponding to the communication method A to the second setting corresponding to the communication method B.

Upon completion of the communication method switching by the lens microcomputer 111, the lens microcomputer 111 cancels the communication wait request BUSY to notify the camera microcomputer 205 of completion of the communication method switching. Then, the lens microcomputer 111 monitors the presence or absence of a transmission request signal RTS notification based on the communication method B.

When the communication wait request BUSY is canceled, the camera microcomputer 205 changes, via the camera side setting unit 206, the communication setting of the camera communication unit 208 from the first setting corresponding to the communication method A to the second setting corresponding to the communication method B. Then, the camera microcomputer 205 monitors the presence or absence of a communication event occurrence based on the communication method B. The timing when the camera microcomputer 205 completes the switching to the communication method B is the switch timing X illustrated in FIG. 6. After the switch timing X, data communication is performed by using the communication method B, as described above with reference to FIGS. 4A to 4C.

As described above, according to one embodiment, the lens microcomputer 111 serving as a communication slave is configured to switch the communication setting from the first setting to the second setting before the camera microcomputer 205 serving as a communication master does. Since the camera microcomputer 205 does not know whether the lens microcomputer 111 can immediately change the communication setting to the second setting, the camera microcomputer 205 confirms that the lens microcomputer 111 has changed the communication setting to the second setting, before changing the communication setting from the first setting to the second setting.

If the camera microcomputer 205 changes the communication setting to the second setting without confirming that the lens microcomputer 111 has changed the communication setting to the second setting, mismatching of the communication method arises between the interchangeable lens 100 and the camera main body 200, which then may become unable to establish communication therebetween. According to the above described embodiment, the camera microcomputer 205 confirms that the lens microcomputer 111 has changed the communication setting to the second setting, before changing the communication setting from the first setting to the second setting, thus preventing the occurrence of the above-described situation.

The lens microcomputer 111 also switches the communication setting of the lens microcomputer 111 from the first setting to the second setting while a communication wait request BUSY notification is being issued to the camera microcomputer 205. This allows the lens microcomputer 111 to change the communication setting in a state where the clock signal CLK is not output from the camera microcomputer 205, avoiding a situation where a communication collision occurs between the camera microcomputer 205 and the lens microcomputer 111.

The lens microcomputer 111 does not necessarily need to switch the communication method in response to a notification of switching from the communication method A to the communication method B, and may be able to refuse the communication method switching. For example, after receiving a notification of switching from the camera microcomputer 205, the lens microcomputer 111 transmits a notification indicating the rejection of the communication method switching to the camera microcomputer 205 via the first data communication channel. Upon reception of the notification, the camera microcomputer 205 can continue communication with the lens microcomputer 111 by using the communication method A, without switching the communication setting. If the lens microcomputer 111 cannot immediately change the communication setting to the second setting, this notification makes it possible to avoid a situation where, immediately after changing the communication setting from the first setting to the second setting, the camera microcomputer 205 needs to change the communication setting back to the first setting.

Power state switching according to the first exemplary embodiment will be described below. As described above, the interchangeable lens 100 according to the present exemplary embodiment can switch between the first and the second power states upon reception of a predetermined signal from the camera microcomputer 205. The interchangeable lens 100 can communicate with the image pickup apparatus by using the communication methods A and B.

Normally, the sleep cancellation command for switching the power state of an interchangeable lens from the second power state to the first power state is transmitted from a camera main body to the interchangeable lens by using the communication method A which is the same as the communication method used in the initial communication. This is because the initial communication is performed by using a communication method which assures the establishment of communication with an interchangeable lens assumed to be attached to the camera main body.

The following considers a case where such an interchangeable lens is configured to be able to switch the power state thereof during communication with a camera main body by using the communication method B. In this case, the interchangeable lens that has entered the second power state during communication with the camera main body by using the communication method B needs to suitably receive a sleep cancellation command transmitted from the camera main body by using the communication method A. Therefore, the interchangeable lens is configured to, when switching to the second power state, switch the communication setting from the second setting corresponding to the communication method B to the first setting corresponding to the communication method A.

However, if the thus-configured interchangeable lens enters the second power state under the influence of noise although the camera main body has not transmitted the sleep command during communication with the camera main body by using the communication method B, the following problem occurs.

If the interchangeable lens enters the second power state under the influence of noise, the communication setting of the camera main body remains unchanged from the second setting since the camera main body has not transmitted a sleep command to the interchangeable lens.

On the other hand, the interchangeable lens switches the communication setting to the first setting when entering the second power state. This condition causes mismatching of the communication setting between the camera main body and the interchangeable lens, making it impossible for the camera main body and the interchangeable lens to suitably perform subsequent communication.

To prevent this situation, the interchangeable lens according to the present exemplary embodiment is configured not to switch from the first power state to the second power state when the communication setting is the second setting.

Even if the accessory apparatus enters the second power state under the influence of noise, this configuration prevents a communication breakdown, enabling the camera main body and the interchangeable lens to suitably communicate with each other.

Figure 7:
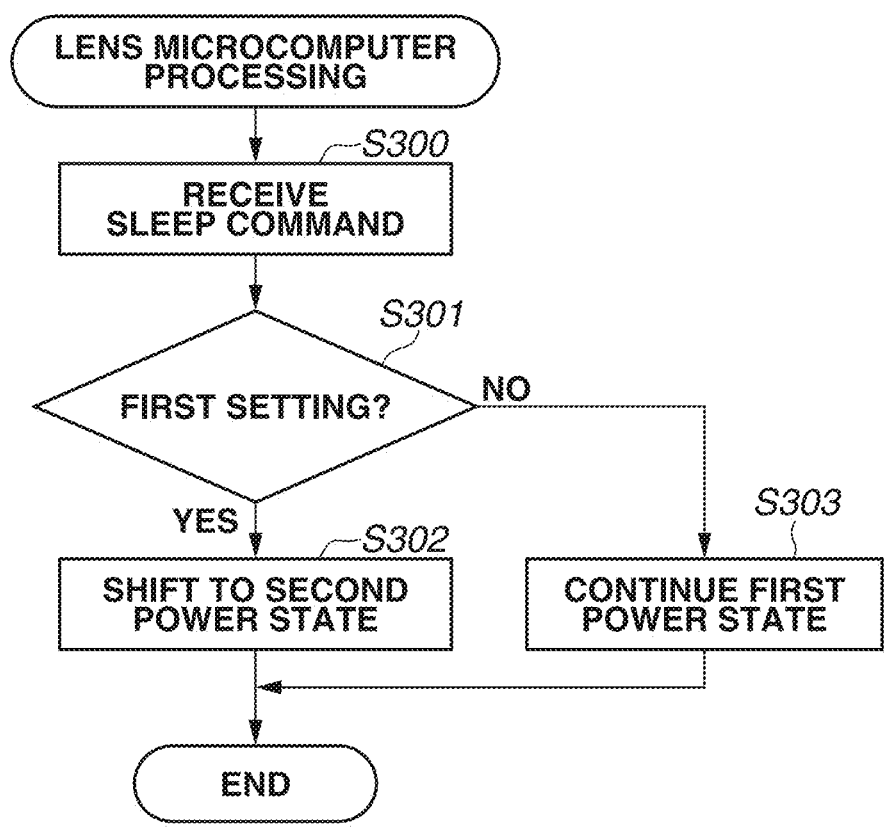
FIG. 7 is a flowchart illustrating processing performed by the accessory apparatus upon reception of a sleep command, according to a first exemplary embodiment.

FIG. 7 is a flowchart illustrating processing when the interchangeable lens 100 receives a command (sleep command) for the switching from the first power state to the second power state from the camera main body 200. The processing method illustrated in FIG. 7 is started from a state where the interchangeable lens 100 is in the first power state.

In step S300, the interchangeable lens 100 receives a sleep command from the camera main body 200. The sleep command received by the interchangeable lens 100 in step S300 includes a signal which is not the sleep command transmitted from the camera main body 200, and has been processed as a sleep command by the interchangeable lens 100 under the influence of noise.

In step S301, the interchangeable lens 100 determines whether the current communication setting of the interchangeable lens 100 is the first setting corresponding to the communication method A. When the current communication setting is the first setting (YES in step S301), the processing proceeds to step S302. In step S302, the power control unit 113 switches the power state of the interchangeable lens 100 from the first power state to the second power state.

On the other hand, when the current communication setting is determined to be not the first setting (NO in step S301), the processing proceeds to step S303. In step S303, the power control unit 113 leaves the power state of the interchangeable lens 100 unchanged from the first power state. More specifically, when the current communication setting is the second setting corresponding to the communication method B, the interchangeable lens 100 ignores the sleep command received in step S300 and maintains the first power state.

This processing makes it possible, during communication using the communication method B, to prevent the accessory apparatus from entering the second power state by noise on a communication line although the image pickup apparatus has not transmitted a sleep command. This enables suitably maintaining communication using the communication method B.

When the communication setting is the second setting, controlling the power state of the interchangeable lens 100 in this way not to switch the power state enables prevention of a communication breakdown under the influence of noise. This allows the interchangeable lens 100 to suitably communicate with the camera main body.

There is also a possibility that, during communication using the communication method A, the accessory apparatus enters the second power state because of noise on a communication line although the image pickup apparatus has not transmitted a sleep command. However, as described above, the camera main body 200 according to the present exemplary embodiment is configured to transmit a sleep cancellation command by using the communication method A that is the first communication method. Therefore, communication using the communication method A can be suitably continued by controlling the power state of the interchangeable lens 100 via the power control unit 113 to switch from the second power state to the first power state upon reception of a signal transmitted from the camera main body 200 by using the communication method A. For example, it is necessary to switch the interchangeable lens 100 from the second power state to the first power state at a falling edge of the clock signal LCLK as a trigger.

The following describes a flow of processing for transmitting a sleep command from the camera main body 200 to the interchangeable lens 100.

Figure 8:
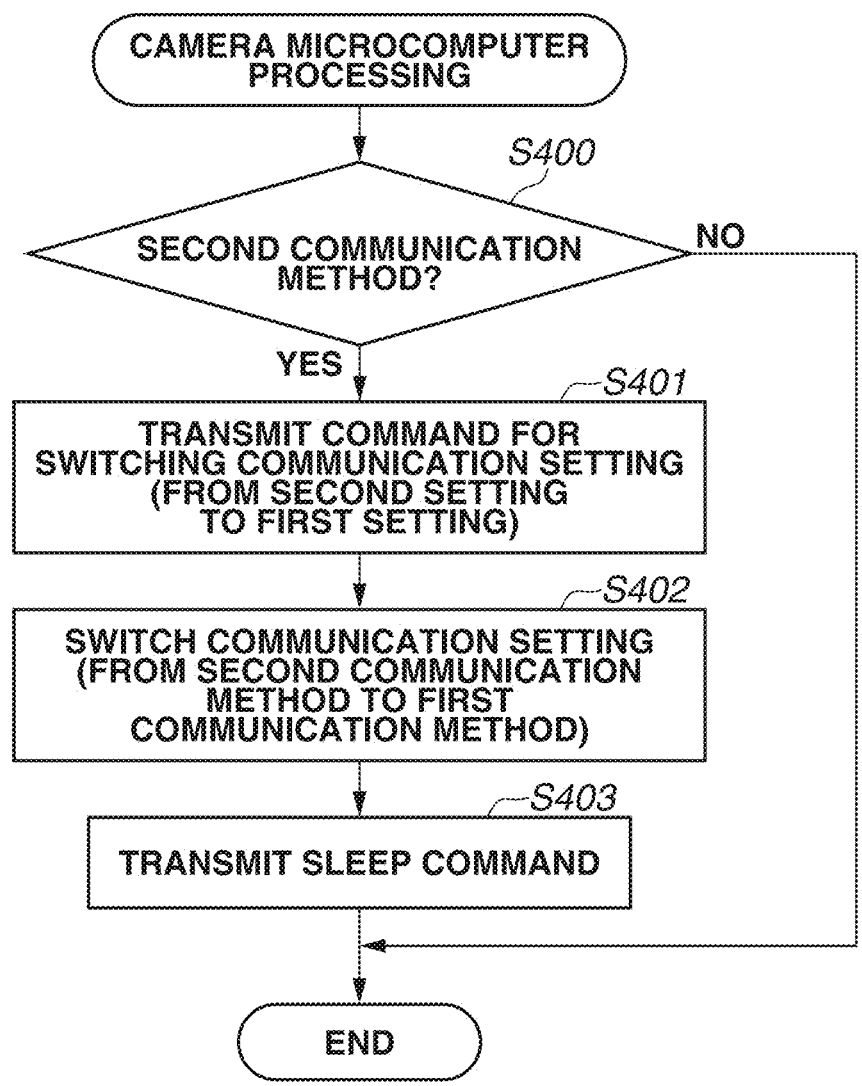
FIG. 8 is a flowchart illustrating processing performed by the image pickup apparatus when the image pickup apparatus transmits a sleep command, according to the first exemplary embodiment.

FIG. 8 is a flowchart illustrating processing for transmitting a sleep command from the camera main body 200 to the interchangeable lens 100. The processing method illustrated in FIG. 8 is started from a state where an event for switching the interchangeable lens 100 from the first power state to the second power state occurs in the camera main body 200. Events for switching the interchangeable lens 100 from the first power state to the second power state include, for example, an event where no operation is performed on a camera system for a predetermined time period and an event where an operation for entering the sleep state is performed by a user.

In step S400, the camera microcomputer 205 confirms whether the current communication setting of the camera main body 200 is the setting corresponding to the communication method B. When the current communication setting is the setting corresponding to the communication method A (NO in step S400), the processing proceeds to step S403. In step S403, the camera main body 200 transmits a sleep command to the interchangeable lens 100.

On the other hand, when the current communication setting of the camera main body 200 is determined to be the setting corresponding to the communication method B (YES in step S400), the processing proceeds to step S401. In this case, the communication setting of both the camera main body 200 and the interchangeable lens 100 corresponds to the communication method B. In step S401, the camera main body 200 transmits a command for switching the communication setting of the interchangeable lens 100 to the first setting to the interchangeable lens 100 by using the communication method B.

In step S402, the camera microcomputer 205 switches the communication setting of the camera main body 200 to the setting corresponding to the communication method A. In steps S401 and S402, the communication setting of both the camera main body 200 and the interchangeable lens 100 corresponds to the communication method A. Subsequently, communication using the communication method A is established.

Then, the processing proceeds to step S403. In step S403, the camera main body 200 transmits a sleep command to the interchangeable lens 100 by using the communication method A.

Thus, when an event for switching the interchangeable lens 100 from the first power state to the second power state occurs during communication with the interchangeable lens 100 based on the communication method B, the power state of the interchangeable lens 100 can be suitably switched.

Power state switching according to a second exemplary embodiment will be described below. Similar to the first exemplary embodiment, the interchangeable lens 100 according to the present exemplary embodiment can switch between the first and the second power states upon reception of a predetermined signal from the camera microcomputer 205. The interchangeable lens 100 can communicate with the image pickup apparatus by using the communication methods A and B.

Unlike the first exemplary embodiment, the interchangeable lens 100 and the camera main body 200 according to the present exemplary embodiment respectively preset the communication method to be used for communication performed when switching the power state of the interchangeable lens 100 via the lens side setting unit 114 and the camera side setting unit 206. This enables suitably performing communication between the interchangeable lens 100 and the camera main body 200 when switching the power state.

Figure 9:
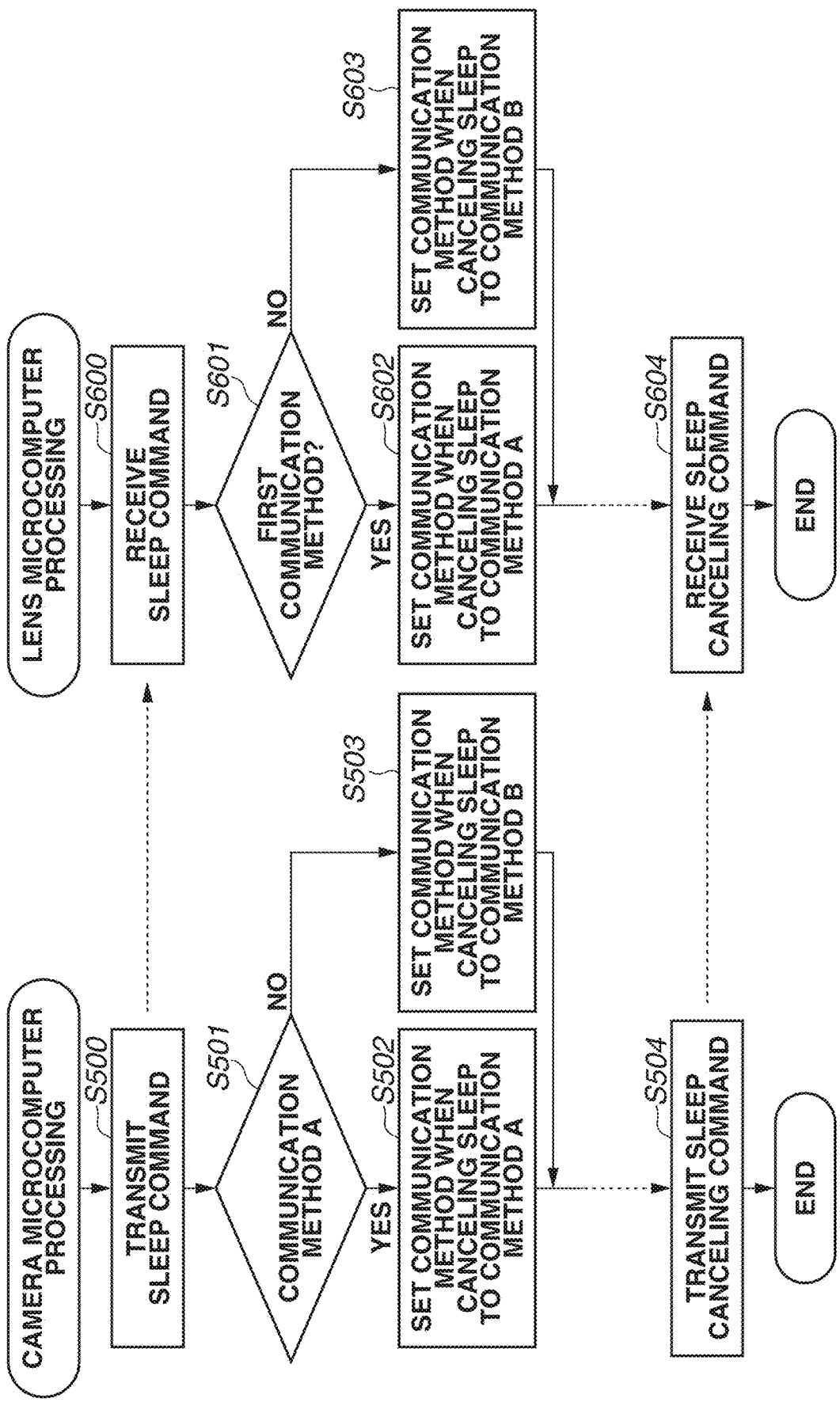
FIG. 9 is a flowchart illustrating processing when switching the power state of the accessory apparatus according to a second exemplary embodiment.

FIG. 9 illustrates a processing method performed by the interchangeable lens 100 according to the present exemplary embodiment to switch the power state from the first power state to the second power state and vice versa. The processing method illustrated in FIG. 9 is started from a state where the interchangeable lens 100 is in the first power state.

First, a flow of processing on the side of the camera main body 200 will be described below. When an event for switching the interchangeable lens 100 from the first power state to the second power state occurs in the camera main body 200, then in step S500, the camera microcomputer 205 transmits a command for switching to the second power state (hereinafter referred to as a sleep command) to the interchangeable lens 100. When the current communication method is the communication method A, the sleep command is transmitted and received according to the communication protocol illustrated in FIGS. 3A to 3C. When the current communication method is the communication method B, the sleep command is transmitted and received according to the communication protocol illustrated in FIGS. 4A to 4C.

According to the present exemplary embodiment, the camera side setting unit 206 sets the communication method to be used when transmitting a command (hereinafter referred to as a sleep cancellation command) for switching the interchangeable lens 100 from the second power state to the first power state, to a communication method that is the same as the one used when the sleep command has been transmitted.

In step S501, the camera microcomputer 205 determines whether the current communication method is the communication method A. When the current communication method is the communication method A (YES in step S501), the processing proceeds to step S502. In step S502, the camera microcomputer 205 sets the communication method to be used when subsequently transmitting a sleep cancellation command, to the communication method A.

On the other hand, when the current communication method is not the communication method A (NO in step S501), the processing proceeds to step S503. In step S503, the camera microcomputer 205 sets the communication method to be used when subsequently transmitting a sleep cancellation command to the lens microcomputer 111, to the communication method B.

In step S502 or S503, the camera microcomputer 205 sets the communication method to be used when subsequently transmitting a sleep cancellation command. Then, when an event for switching the interchangeable lens 100 from the second power state to the first power state occurs in the camera main body 200, the processing proceeds to step S504. In step S504, the camera microcomputer 205 transmits a sleep cancellation command to the lens microcomputer 111 by using the communication method set in step S502 or S503.

A flow of processing on the side of the interchangeable lens 100 will be described below. In step S600, the lens microcomputer 111 receives a sleep command from the camera microcomputer 205. Then, the processing proceeds to step S601.

According to the present exemplary embodiment, when the lens microcomputer 111 receives a sleep command, the lens side setting unit 114 sets the communication method to be used when communicating with the camera main body 200, to a communication method that is the same as the one used when the sleep command has been received. In step S601, the lens microcomputer 111 determines whether the current communication method is the communication method A. When the current communication method is the communication method A (YES in step S601), the processing proceeds to step S602. In step S602, the lens side setting unit 114 sets the communication method to be used when receiving a sleep cancellation command, to the communication method A, and the power control unit 113 switches the power state of the interchangeable lens 100 from the first power state to the second power state.

In this case, in step S502, the camera side setting unit 206 sets the communication method to be used when transmitting a sleep cancellation command, to the communication method B. Therefore, the communication method to be used when the lens microcomputer 111 receives a sleep cancellation command will coincide with the communication method to be used when the camera microcomputer 205 transmits a sleep cancellation command. Therefore, the interchangeable lens 100 can suitably switch the power state according to a command of the camera microcomputer 205. When the camera microcomputer 205 transmits a sleep cancellation command to the lens microcomputer 111, then in step S604, the power control unit 113 switches the power state of the interchangeable lens 100 from the second power state to the first power state at a falling edge of the clock signal LCLK as a trigger. After the switching to the first power state is completed, the lens microcomputer 111 communicates with the camera microcomputer 205 according to the communication protocol of the communication method A.

On the other hand, when the current communication method is determined not to be the communication method A (NO in step S601), the processing proceeds to step S603. In step S603, the lens side setting unit 114 sets the communication method when receiving a sleep cancellation command, to the communication method B, and the power control unit 113 switches the power state of the interchangeable lens 100 from the first power state to the second power state.

In this case, in step S503, the camera side setting unit 206 sets the communication method to be used when transmitting a sleep cancellation command, to the communication method B. Therefore, the communication method to be used when the lens microcomputer 111 receives a sleep cancellation command will coincide with the communication method to be used when the camera microcomputer 205 transmits a sleep cancellation command. Therefore, the interchangeable lens 100 can suitably switch the power state according to a command of the camera microcomputer 205. When the camera microcomputer 205 transmits a sleep cancellation command to the lens microcomputer 111, then in step S604, the power control unit 113 switches the power state of the interchangeable lens 100 from the second power state to the first power state at a falling edge of the transmission request RTS as a trigger. After the switching to the first power state is completed, the lens microcomputer 111 communicates with the camera microcomputer 205 according to the communication protocol of the communication method B.

As described above, the power state can be suitably switched by presetting the communication method to be used for communication performed at the time of switching from the second power state to the first power state. Further, communication can be suitably performed even after the sleep state is canceled.

According to the present exemplary embodiment, the camera side setting unit 206 and the lens side setting unit 114 set the communication method such that the communication method to be used when transmitting and receiving a sleep cancellation command coincides with the communication method to be used when transmitting and receiving a sleep command. Therefore, even if the lens microcomputer 111 incorrectly recognizes a communication command other than a sleep command as a sleep command under the influence of noise and switches to the second power state, the lens microcomputer 111 can switch to the first power state by using a communication command to be subsequently transmitted. Thus, noise immunity to channels can also be improved.

Power state switching according to a third exemplary embodiment will be described below. Similar to the first and the second exemplary embodiments, the interchangeable lens 100 according to the present exemplary embodiment can switch between the first and the second power states upon reception of a predetermined signal from the camera microcomputer 205. The interchangeable lens 100 can communicate with the image pickup apparatus by using the communication methods A and B.

Similar to the second exemplary embodiment, the interchangeable lens 100 and the camera main body 200 according to the present exemplary embodiment preset the communication method to be used for communication when switching the power state of the interchangeable lens 100 via the lens side setting unit 114 and the camera side setting unit 206. However, according to the present exemplary embodiment, unlike the second exemplary embodiment, the interchangeable lens 100 and the camera main body 200 set the communication method to be used when transmitting and receiving a sleep cancellation command, to a communication method that is the same as the one used for the initial communication format, regardless of the communication method to be used when transmitting and receiving a sleep command. Similar to the first and the second exemplary embodiments, the communication method used for the initial communication format according to the present exemplary embodiment is the communication method A.

Figure 10:
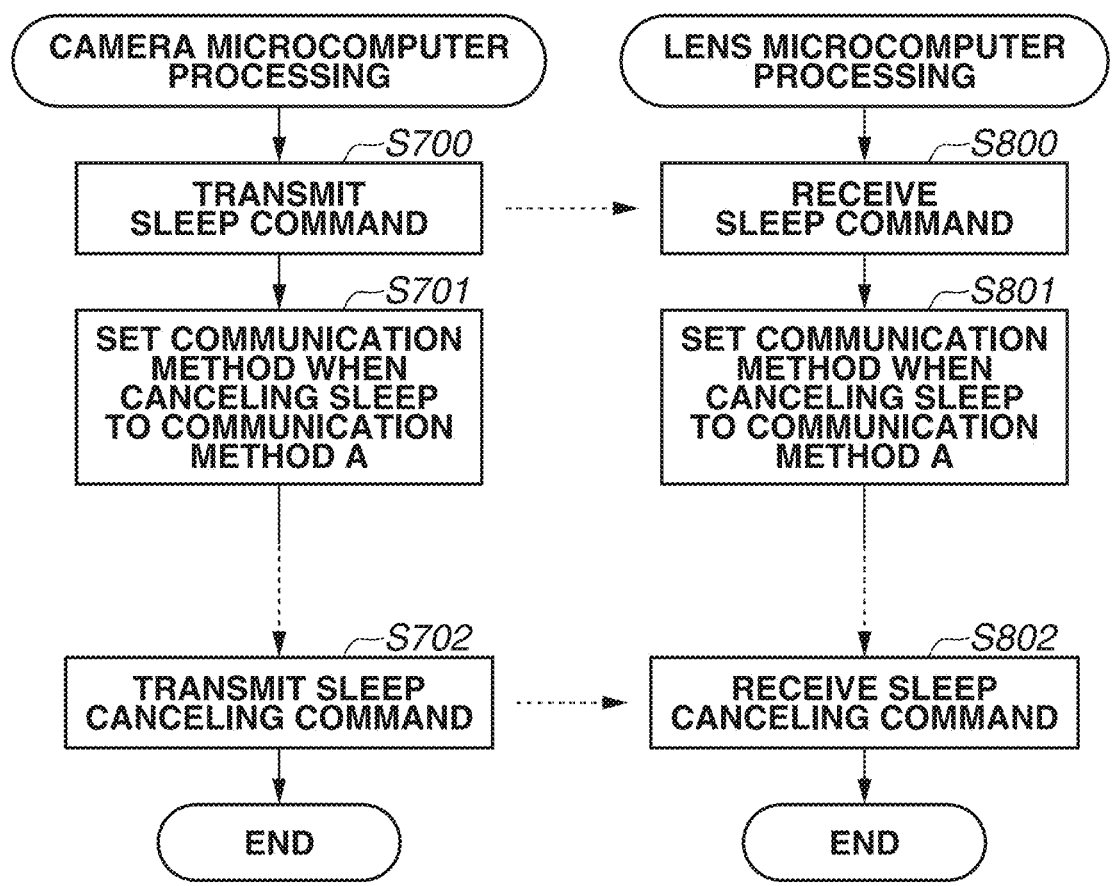
FIG. 10 is a flowchart illustrating processing when switching the power state of the accessory apparatus according to a third exemplary embodiment.

FIG. 10 illustrates a processing method performed by the interchangeable lens 100 according to the present exemplary embodiment to switch the power state from the first power state to the second power state and vice versa. The processing method illustrated in FIG. 10 is started from a state where the interchangeable lens 100 is in the first power state.

First, a flow of processing on the side of the camera main body 200 will be described below. When an event for switching the interchangeable lens 100 from the first power state to the second power state occurs in the camera main body 200, then in step S700, the camera microcomputer 205 transmits a sleep command to the lens microcomputer 111. When the current communication method is the communication method A, the command is transmitted and received according to the communication protocol illustrated in FIGS. 3A to 3C. When the current communication method is the communication method B, the command is transmitted and received according to the communication protocol illustrated in FIGS. 4A to 4C.

In step S701, the camera side setting unit 206 sets the communication method to be used when subsequently transmitting a sleep cancellation command, to the communication method A.

In step S701, the camera microcomputer 205 sets the communication method to be used when subsequently transmitting a sleep cancellation command. Then, when an event for switching the interchangeable lens 100 from the second power state to the first power state occurs in the camera main body 200, the processing proceeds to step S702. In step S702, the camera microcomputer 205 transmits a sleep cancellation command to the lens microcomputer 111 by using the communication method A which is the communication method set in step S701.

A flow of processing on the side of the interchangeable lens 100 will be described below. In step S800, when the lens microcomputer 111 receives a sleep command from the camera microcomputer 205, the processing proceeds to step S801.

In step S801, the lens microcomputer 111 sets the communication method to be used when receiving a sleep cancellation command, to the communication method A, and the power control unit 113 switches the power state of the interchangeable lens 100 from the first power state to the second power state.

As described above, according to the present exemplary embodiment, in step S701, the camera side setting unit 206 sets the communication method to be used when transmitting a sleep cancellation command, to the communication method A. Therefore, the communication method to be used when the lens microcomputer 111 receives a sleep cancellation command will coincide with the communication method to be used when the camera microcomputer 205 transmits a sleep cancellation command. Therefore, the interchangeable lens 100 can suitably switch the power state according to a command of the camera microcomputer 205.

When the camera microcomputer 205 transmits a sleep cancellation command to the lens microcomputer 111, then in step S802, the power control unit 113 switches the power state of the interchangeable lens 100 from the second power state to the first power state at a falling edge of the clock signal LCLK as a trigger. After the switching to the first power state is completed, the lens microcomputer 111 communicates with the camera microcomputer 205 according to the communication protocol of the communication method A.

As described above, the power state can be suitably switched by presetting the communication method to be used for communication between the interchangeable lens 100 and the camera main body 200 that is performed at the time of switching from the first power state to the second power state. Further, communication can be suitably performed even after the sleep state is canceled.

The second exemplary embodiment has been described above based on an example in which the communication method to be used when transmitting and receiving a sleep cancellation command is differentiated according to the communication method to be used when transmitting and receiving a sleep command. In this case, it is necessary to prepare respective processing flows for canceling the sleep state corresponding to the communication methods A and B.

On the other hand, according to the present exemplary embodiment, the camera side setting unit 206 and the lens side setting unit 114 set the communication method to be used when transmitting and receiving a sleep cancellation command, to the communication method A which is the same as the communication method used for the initial communication format, regardless of the communication method to be used when transmitting and receiving a sleep command. Thus, the processing flow for canceling the sleep state can be made common with the processing flow when the interchangeable lens 100 is attached to the camera main body 200, illustrated in FIG. 5. More specifically, according to the present exemplary embodiment, the processing when canceling the sleep state can be simplified.

The above-described exemplary embodiments are to be understood to be examples of the present disclosure only, and it is to be understood that the present disclosure is not limited to these embodiments. The embodiments can be modified and changed in diverse ways without departing from the spirit of the present disclosure. For example, although, in the above-described exemplary embodiments, an interchangeable lens is used as an accessory apparatus, a flash unit may also serve as the accessory apparatus in other embodiments as long as the flash unit is provided with a function for communicating with an image pickup apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-061563, filed Mar. 27, 2017, and No. 2017-061564, filed Mar. 27, 2017, which are hereby incorporated by reference herein in their entirety.

What is claimed is:

1. An accessory apparatus capable of communicating with an image pickup apparatus by using a plurality of communication methods, the accessory apparatus comprising:
a mount for detachably attaching the accessory apparatus to the image pickup apparatus; and
an accessory-side controller configured to:
when the accessory apparatus is attached to the image pickup apparatus, perform initial communication for transmitting, to the image pickup apparatus, information about a communication method supported by the accessory apparatus;
switch a communication setting between a first setting corresponding to a first communication method that is the communication method used in the initial communication and a second setting corresponding to a second communication method different from the first communication method; and
upon reception of a signal transmitted from the image pickup apparatus, switch between a first power state where communication with the image pickup apparatus is possible and a second power state which provides smaller power consumption than the first power state,
wherein, in a case where the communication setting of the accessory apparatus is the first setting, the accessory-side controller performs switching from the first power state to the second power state upon reception of the signal transmitted from the image pickup apparatus, and
wherein, in a case where the communication setting of the accessory apparatus is the second setting, the accessory-side controller does not perform switching from the first power state to the second power state.

2. The accessory apparatus according to claim 1, wherein the accessory apparatus communicates with the image pickup apparatus by using:
a notification channel configured to be used for a notification;
a first data communication channel configured to be used for data transmission from the accessory apparatus to the image pickup apparatus; and
a second data communication channel configured to be used for data transmission from the image pickup apparatus to the accessory apparatus,
wherein the first communication method is a clock-synchronous serial communication method, and the second communication method is an asynchronous serial communication method,
wherein, in a case where the communication setting of the accessory apparatus is the first setting, the accessory apparatus issues to the image pickup apparatus via the notification channel a notification of a communication wait request for preventing data communication from the image pickup apparatus to the accessory apparatus, and
wherein, in a case where the communication setting of the accessory apparatus is the second setting, the accessory apparatus issues a notification of the communication wait request to the image pickup apparatus via the first data communication channel.

3. The accessory apparatus according to claim 2, wherein, when the communication setting of the accessory apparatus is the first setting and a signal for communication method switching is received from the image pickup apparatus, the accessory apparatus issues a notification of the communication wait request to the image pickup apparatus, and
wherein the accessory apparatus switches the communication method while a notification of the communication wait request is being issued.

4. The accessory apparatus according to claim 2, wherein, upon completion of the switching from the first setting to the second setting, the accessory apparatus issues a completion notification indicating the completion of the switching to the image pickup apparatus.

5. The accessory apparatus according to claim 4, wherein the completion notification is issued by canceling the communication wait request.

6. An image pickup apparatus capable of communicating with an accessory apparatus by using a plurality of communication methods, the image pickup apparatus comprising:
a mount for detachably attaching the accessory apparatus; and
a camera-side controller configured to control communication with the accessory apparatus,
wherein, when the accessory apparatus is attached to the image pickup apparatus, the camera-side controller performs initial communication for acquiring information about a communication method supported by the accessory apparatus, by using a first communication method, and
wherein, in a state where a communication setting of the accessory apparatus is a setting corresponding to a second communication method different from the first communication method, the camera-side controller transmits to the accessory apparatus a signal for switching the communication setting of the accessory apparatus to a setting corresponding to the first communication method, and then transmits to the accessory apparatus a signal for switching a power state thereof from a first power state to a second power state which provides smaller power consumption than the first power state.

7. The image pickup apparatus according to claim 6,
wherein the first communication method is a clock-synchronous serial communication method in synchronization with a clock signal, and the second communication method is an asynchronous serial communication method,
wherein the camera-side controller configured to switch a communication setting of the image pickup apparatus between the setting corresponding to the first communication method and the setting corresponding to the second communication method, and
wherein, upon reception of a notification indicating that the accessory apparatus has completed the switching from the setting corresponding to the first communication method to the setting corresponding to the second communication method, from the accessory apparatus, the camera-side controller switches the communication setting of the image pickup apparatus from the setting corresponding to the first communication method to the setting corresponding to the second communication method.

8. The image pickup apparatus according to claim 6,
wherein the camera-side controller communicates with the accessory apparatus by using:
a notification channel configured to be used for a notification;
a first data communication channel configured to be used for data transmission from the accessory apparatus to the image pickup apparatus; and
a second data communication channel configured to be used for data transmission from the image pickup apparatus to the accessory apparatus,
wherein the first communication method is a clock-synchronous serial communication method in synchronization with a clock signal, and the second communication method is an asynchronous serial communication method,
wherein the camera-side controller configured to switch a communication setting of the image pickup apparatus between the setting corresponding to the first communication method and the setting corresponding to the second communication method,
wherein, in a case where the communication setting of the image pickup apparatus is the setting corresponding to the first communication method, the camera-side controller transmits the clock signal to the accessory apparatus via the notification channel, and
wherein, in a case where the communication setting of the image pickup apparatus is the setting corresponding to the second communication method, the camera-side controller transmits to the accessory apparatus via the notification channel a transmission request signal for requesting communication from the accessory apparatus to the image pickup apparatus.

9. An imaging system comprising:
the image pickup apparatus according to claim 6; and
an accessory apparatus configured to be attachable to the image pickup apparatus and capable of communicating with the image pickup apparatus by using the first and the second communication methods.

10. An accessory apparatus capable of communicating with an image pickup apparatus by using a plurality of communication methods, the accessory apparatus comprising:
a mount for detachably attaching the accessory apparatus to the image pickup apparatus; and
an accessory-side controller configured to:
upon reception of a signal transmitted from the image pickup apparatus, switch between a first power state where communication with the image pickup apparatus is possible and a second power state which provides smaller power consumption than the first power state; and
set a communication method to be used for communication with the image pickup apparatus that is performed at the time of switching from the second power state to the first power state.

11. The accessory apparatus according to claim 10,
wherein the accessory-side controller sets the communication method to be used for communication with the image pickup apparatus that is performed at the time of switching from the second power state to the first power state, to a communication method that is the same as the one used for communication with the image pickup apparatus that has been performed at the time of switching from the first power state to the second power state.

12. The accessory apparatus according to claim 10,
wherein, when attached to the image pickup apparatus, the accessory apparatus performs initial communication for transmitting, to the image pickup apparatus, information about a communication method supported by the accessory apparatus, and
wherein the accessory-side controller sets the communication method to be used for communication with the image pickup apparatus that is performed at the time of switching from the second power state to the first power state, to a communication method that is the same as the one used in the initial communication.

13. The accessory apparatus according to claim 10,
wherein the accessory apparatus communicates with the image pickup apparatus by using:
a notification channel configured to be used for a notification;
a first data communication channel configured to be used for data transmission from the accessory apparatus to the image pickup apparatus; and a second data communication channel configured to be used for data transmission from the image pickup apparatus to the accessory apparatus, wherein the accessory apparatus can switch the communication method to be used for communication with the image pickup apparatus between a first communication method that is a clock-synchronous serial communication method in synchronization with a clock signal and a second communication method that is an asynchronous serial communication method, wherein, when communicating with the image pickup apparatus by using the first communication method, the accessory apparatus issues to the image pickup apparatus via the notification channel a notification of a communication wait request for preventing data transmission from the image pickup apparatus to the accessory apparatus, and wherein, when communicating with the image pickup apparatus by using the second communication method, the accessory apparatus issues a notification of the communication wait request to the image pickup apparatus via the first data communication channel.

14. The accessory apparatus according to claim 13, wherein, when the accessory apparatus receives, from the image pickup apparatus, a signal for switching the communication method during communication with the image pickup apparatus by using the first communication method, the accessory apparatus issues a notification of the communication wait request to the image pickup apparatus, and wherein the accessory-side controller switches a communication method while a notification of the communication wait request is being issued.

15. The accessory apparatus according to claim 13, wherein, upon completion of the switching from the first communication method to the second communication method, the accessory apparatus issues a completion notification indicating the completion of the switching to the image pickup apparatus.

16. The accessory apparatus according to claim 15, wherein the completion notification is issued by canceling the communication wait request.

17. An image pickup apparatus capable of communicating with an accessory apparatus by using a plurality of communication methods, the image pickup apparatus comprising:
a mount for detachably attaching the accessory apparatus; and
a camera-side controller configured to set a communication method to be used when transmitting to the accessory apparatus a signal for switching a power state of the accessory apparatus to a first power state from a second power state which provides smaller power consumption than the first power state.

18. The image pickup apparatus according to claim 17, wherein the camera-side controller sets the communication method used for the signal transmitted to the accessory apparatus to switch the power state thereof from the second power state to the first power state, to a communication method that is the same as the one used for the signal transmitted to the accessory apparatus to switch the power state thereof from the first power state to the second power state.

19. The image pickup apparatus according to claim 17, wherein, when the accessory apparatus is attached to the image pickup apparatus, the image pickup apparatus performs initial communication for acquiring information about a communication method supported by the accessory apparatus from the accessory apparatus, and wherein the camera-side controller sets the communication method used for the signal transmitted to the accessory apparatus to switch the power state thereof from the second power state to the first power state, to a communication method that is the same as the one used in the initial communication.

20. The image pickup apparatus according to claim 17, wherein the image pickup apparatus can switch the communication method to be used for communication with the accessory apparatus between a first communication method that is a clock-synchronous serial communication method in synchronization with a clock signal and a second communication method that is an asynchronous serial communication method, and wherein, upon reception of a notification indicating that the accessory apparatus has completed the switching from the first communication method to the second communication method, from the accessory apparatus, the image pickup apparatus performs the switching from the first communication method to the second communication method.

21. The image pickup apparatus according to claim 17, wherein the image pickup apparatus communicates with the accessory apparatus by using:
a notification channel configured to be used for a notification;
a first data communication channel configured to be used for data transmission from the accessory apparatus to the image pickup apparatus; and
a second data communication channel configured to be used for data transmission from the image pickup apparatus to the accessory apparatus, wherein the image pickup apparatus can switch the communication method to be used for communication with the accessory apparatus between a first communication method that is a clock-synchronous serial communication method in synchronization with a clock signal and a second communication method that is an asynchronous serial communication method, wherein, when communicating with the accessory apparatus by using the first communication method, the image pickup apparatus transmits the clock signal to the accessory apparatus via the notification channel, and wherein, when communicating with the accessory apparatus by using the second communication method, the image pickup apparatus transmits to the accessory apparatus via the notification channel a transmission request signal for requesting communication from the accessory apparatus to the image pickup apparatus.

22. An imaging system comprising:
the image pickup apparatus according to claim 17; and
an accessory apparatus configured to be attachable to the image pickup apparatus and capable of communicating with the image pickup apparatus by using the plurality of communication methods.

* * * * *